United States Patent [19]
Van Brussell et al.

[11] 3,891,808
[45] June 24, 1975

[54] DIAL PULSE RECEIVER

[75] Inventors: Marcel A. Van Brussell, Hoboken, Belgium; Raymond Louis Julia-Pollé, Sydney, Australia

[73] Assignee: International Standard Electric Corporation, New York, N.Y.

[22] Filed: Mar. 5, 1973

[21] Appl. No.: 337,829

[30] Foreign Application Priority Data

Mar. 6, 1972 Belgium .............................. 780235

[52] U.S. Cl. .............................................. 179/16 EA
[51] Int. Cl. .............................................. H04q 1/36
[58] Field of Search ............ 179/16 E, 16 EA, 16 F, 179/175.2 A; 328/164

[56] References Cited

UNITED STATES PATENTS

| | | | |
|---|---|---|---|
| 3,092,691 | 6/1963 | Burns et al. | 179/16 EA |
| 3,312,784 | 4/1967 | Draper, Jr. | 179/16 E |
| 3,452,220 | 6/1969 | Fritschi | 179/16 E |
| 3,659,055 | 4/1972 | Witmore | 179/16 E |
| 3,671,875 | 6/1972 | Pento | 179/16 E |
| 3,766,323 | 10/1973 | Wittman | 179/16 E |
| 3,772,474 | 11/1973 | Wisotzky | 179/16 EA |
| 3,794,775 | 2/1974 | Hicks et al. | 179/16 EA |

OTHER PUBLICATIONS

Herbert W. Jackson, Introduction to Electric Circuits, Copywright 1959, Prentice Hall Publishers, Library of Congress No. 65-20720, pp. 424 & 425.

*Primary Examiner*—Kathleen H. Claffy
*Assistant Examiner*—Randall P. Myers
*Attorney, Agent, or Firm*—James B. Raden; D. P. Warner

[57] ABSTRACT

A dial pulse receiver forms part of a pool of receivers provided in common for a plurality of incoming junctors, each receiver output being tested by a computer every 14 milliseconds. The receiver prevents spurious signals shorter than a predetermined duration which are applied at its input from reaching its output. The receiver is also adapted to automatically detect the accidental connection of the AC mains to a subscriber line.

23 Claims, 3 Drawing Figures

DIAL PULSE RECEIVER

BACKGROUND OF THE INVENTION

1. Field of the Invention

The present invention relates to a two-level signalling system.

In particular, it relates to a dial pulse receiver capable of distinguishing correct pulses from spurious signals shorter than a predetermined duration. It includes the capacity to prevent spurious signals from reaching its output and to provide distinct outputs indicating A.C. signals have been received from power mains.

2. Description of the Prior Art

In the computer controlled telecommunication switching system according to Belgian Pat. No. 709 719 (S. KOBUS et al., 19-4-1-2-13) dial pulses, each formed by an opening of a subscriber's line loop, are detected at the output of this subscriber's line by computer controlled scanning means which scan the line output every 14 milliseconds. The computer memorizes the scanned states of the line output as a binary bit, i.e. 1 and 0 for a closed and an open line loop respectively, a dial pulse or loop opening being registered in memory when a transition from 1 to 0 is detected upon comparing the results of two successive scanning operations on a line output.

A drawback of this known system is that a spurious pulse or line opening which is not started and finished between two successive scans of a line, i.e. within a scanning period, is erroneously registered as a dial pulse.

A possible solution to eliminate this drawback is to register a line opening only when three successive scans provide the result 100. This means however that in order that all dial pulses should be registered they all should have a duration which is about equal to twice the scanning period or alternatively the scanning period should be equal to about two times the duration of the smallest dial pulse. Since the last mentioned duration may be as small as 16 milliseconds the scanning period should be equal to about 8 milliseconds. Such a relatively high scanning frequency may constitute too large a load for the computer.

SUMMARY OF THE INVENTION

An object of the present invention is therefore to provide a two-level signalling system which is adapted to prevent spurious two-level input pulses from reaching its output to be subsequently scanned.

The present two-level signalling system is particularly characterized in that it includes a filter to eliminate two-level input pulses below a predetermined duration, said filter including first and second delay means able to effectively react to positive and negative level changes respectively and whose output signals cause the triggering of a bistate device to one or the other state respectively, said first and second delay means producing an output signal only if the new level has a minimum predetermined first and second duration respectively.

Used in the above telecommunication switching system the present signalling system permits the correct registry of all dial pulses without necessitating too high a scanning frequency of the output of the bistate device.

When equipment according to the present invention is employed and mains input signals are applied to the input of the above described signalling system due to a fault and when these signals have a frequency lying inside the range eliminated by the filter they will consequently not appear at the output of the system so that one will not be aware of the fault.

Another object of the present invention is therefore to provide a signalling system, including a receiver to receive input signals applied to its input, which is adapted not only to eliminate input signals having a duration smaller than a predetermined duration but also to detect the presence of an above mentioned fault.

The present signalling system is particularly characterized in that the receiver includes a filter preventing certain input signals having a frequency inside a predetermined frequency range from appearing at its output and detecting means to detect other input signals (such as positive portions of AC power mains signals) having a frequency inside said predetermined frequency range.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DESCRIPTION OF PREFERRED EMBODIMENTS

Figure 1:
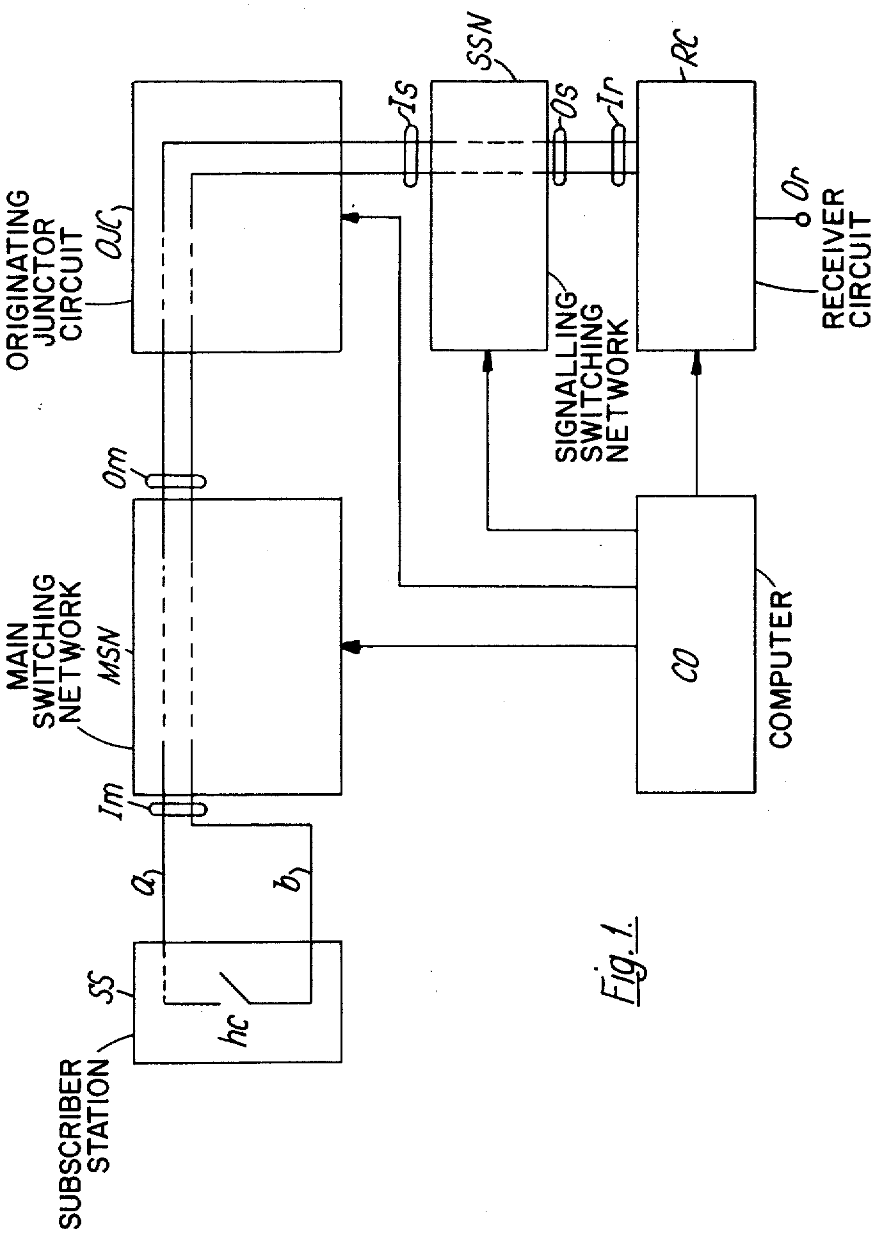
FIG. 1 shows a signalling system according to the present invention.

Referring to FIG. 1, the signalling system shown therein forms part of a computer controlled telephone switching system. It includes a plurality of subscriber stations such as SS which are each coupled to an input such as Im of a main switching network MSN via a telephone line such as *a*, *b*. Each subscriber station such as SS includes a telephone subset (not shown) having a dial (also not shown) and a hook contact hc connected between the telephone line conductors *a* and *b*. This hook contact hc is closed when the subscriber takes the receiver off the hook of his telephone. The network MSN is constituted by a plurality of interconnected switching stages (not shown) and has a plurality of outputs such as Om which are each coupled to the input of an originating junctor circuit such as OJC.

Each of the originating junctor circuits such as OJC is connected to an input such as Is of a signalling switching network SSN constituted by a plurality of interconnected switching stages (not shown) and having a plurality of outputs such as Os which are each coupled to the input Ir of a receiver circuit such as RC.

Finally, the system includes a computer CO which is adapted to control the establishment and release of a path between a subscriber station SS and a receiver circuit RC and is therefore adapted to control the MSN, the OJC, the SSN and the RC as schematically indicated by the lines terminating in arrows. The computer CO more particularly controls the scanning of the outputs such as OR of the receiver circuits such as RC through the intermediary of one of its scanner circuits such as SC (FIG. 2) in order to receive the dial pulses and store them in a counter such as CR.

Figure 2:
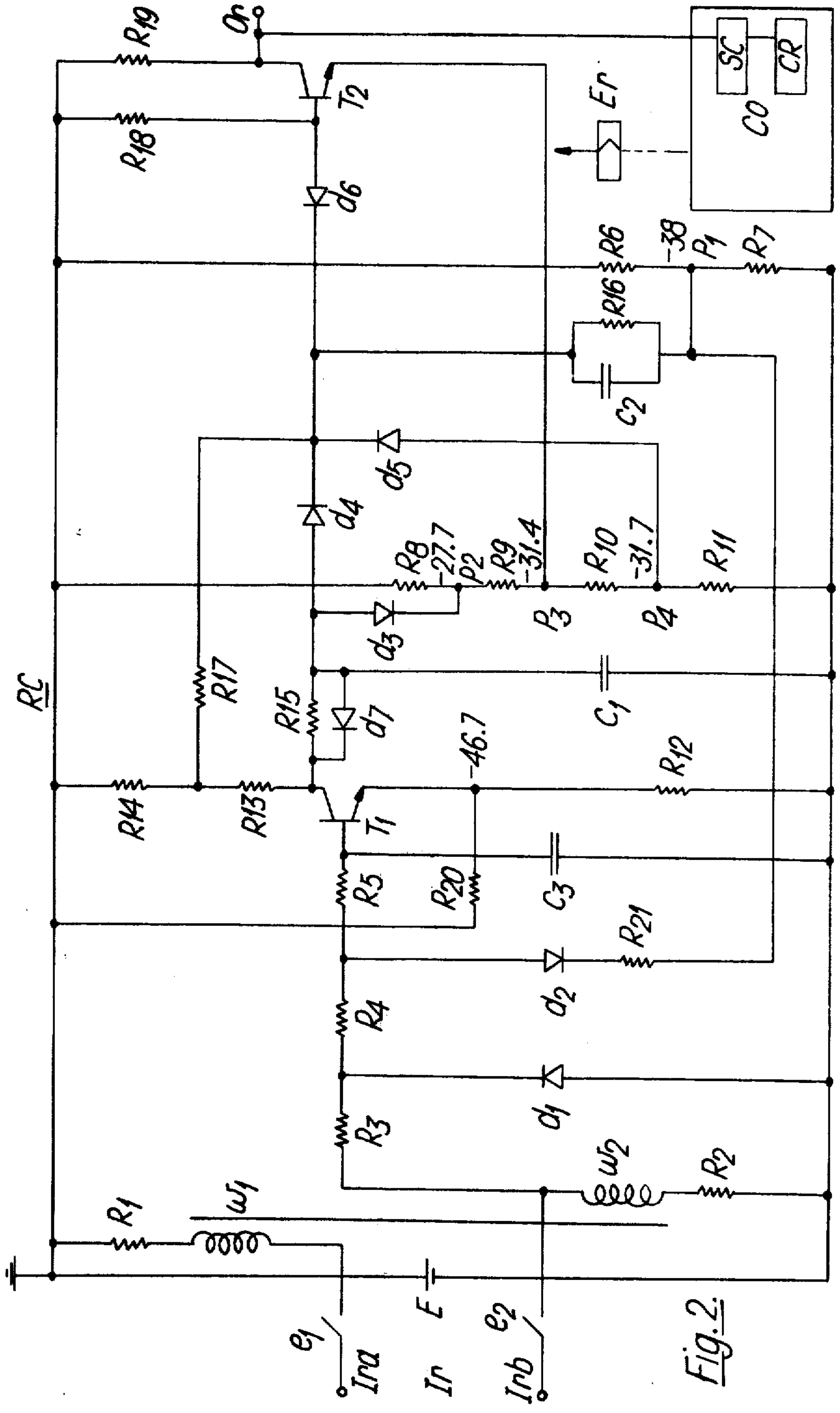
FIG. 2 is a detailed view of a receiver circuit forming part of this signalling system.

Referring to FIG. 2, the receiver circuit RC shown therein has an input Ir comprising the two input terminals Ira and Irb which are coupled on the one hand to the line conductors a and b and on the other hand to the positive and negative poles of a DC source E of 48 volts respectively, the positive pole being grounded. More particularly input terminal Ira is coupled to the grounded positive pole of the DC source E via the series connection of make contact el, winding wl of a transformer, and resistance R1. Input terminal Irb is coupled to the negative pole or battery of the DC source E via the series connection of make contact *e*2, winding *w*2 of the above transformer and resistance R2. The transformer *w*1, *w*2 is used to apply dial tone to the line.

The contacts *e*1 and *e*2 are contacts of a relay Er which is controlled by the computer CO. Input terminal Irb is also connected to the base of an NPN transistor T1 via the series connected resistors R3, R4 and R5. The junction point of the resistors R3 and R4 is connected to battery via diode dl and is thus clamped to this battery, whereas the junction point of the resistors R4 and R5 is connected to the tapping point Pl of a potentiometer constituted by the resistors R6 and R7 via diode d2 and resistor R21. This potentiometer is branched across the poles of the DC source E.

Another potentiometer constituted by the resistors R8, R9, R10 and R11 is also connected across this DC source E. The junction point of the resistor R5 and the base of transistor T1 is connected to battery via capacitor C3. The emitter of this transistor T1 is connected to the junction point of the resistor R20 and R12 which form another potentiometer branched between ground and battery. The collector of transistor T1 is connected, on the one hand to ground via the series connection of resistors R13 and R14, and on the other hand to battery via the series connection of resistor R15 and capacitor Cl, diode d7 being branched in parallel with R15.

The junction point of resistor R15 and capacitor Cl is connected to the tapping point P2 of the potentiometer R8-R11 via diode d3 and is thus clamped to the potential of this point. The junction point of R15 and Cl is also connected to the above tapping point Pl of potentiometer R6, R7 via the series connection of diode d4 and capacitor C2 in parallel with resistor R16. The junction point of the diode d4 and the capacitor C2 is connected to the tapping point P4 of the potentiometer R8-R11 via diode d5 and is thus clamped to the potential of this junction point.

The junction point of d4 and C2 is also connected to that of the resistors R13 and R14 via resistor R17 and to the cathode of diode d6 the anode of which is connected to the base of NPN transistor T2, this base being grounded via resistor R18. The emitter of transistor T2 is connected to the tapping point P3 of the potentiometer R8-R11 and its collector is grounded via resistor R19. This collector which constitutes the output Or of the receiver circuit RC is connected to a scanner circuit SC of the computer CO which is adapted to scan this output. This scanner circuit SC is connected to a counter CR.

Preferred valves of the various resistors and capacitors are:

| | | | |
|---|---|---|---|
| R1 | 100 ohms | R12 | 330 ohms |

-Continued

| | | | |
|---|---|---|---|
| R2 | 100 ohms | R13 | 16 kilo-ohms |
| R3 | 12 kilo-ohms | R14 | 33 kilo-ohms |
| R4 | 8.2 kilo-ohms | R15 | 62 kilo-ohms |
| R5 | 8.2 kilo-ohms | R16 | 200 kilo-ohms |
| R6 | 18 kilo-ohms | R17 | 1 megohm |
| R7 | 4.7 kilo-ohms | R18 | 1.6 megohm |
| R8 | 5.6 kilo-ohms | R19 | 300 kilo-ohms |
| R9 | 750 ohms | R20 | 11.5 kilo-ohms |
| R10 | 43 ohms | R21 | 20 kilo-ohms |
| | | C1 | 0.22 microfarads |
| | | C2 | 0.1 microfarad |
| | | C3 | 0.1 microfarad |

The operation of the above described signalling system is described hereinafter. Hereby the voltage drops over conductive diodes will be neglected, for the purpose of simplifying the description.

From the moment the receiver circuit RC is placed in service due to the fact that it is branched between the poles of the DC source E, currents flow in the following circuits:

1. ground, R8, R9, R10, R11, battery;

With the above given values of the components the potentials at the tapping points P2, P3 and P4 are equal to about −27.7 Volts, −31.4 Volts and −31.7 Volts respectively.

Figure 3:
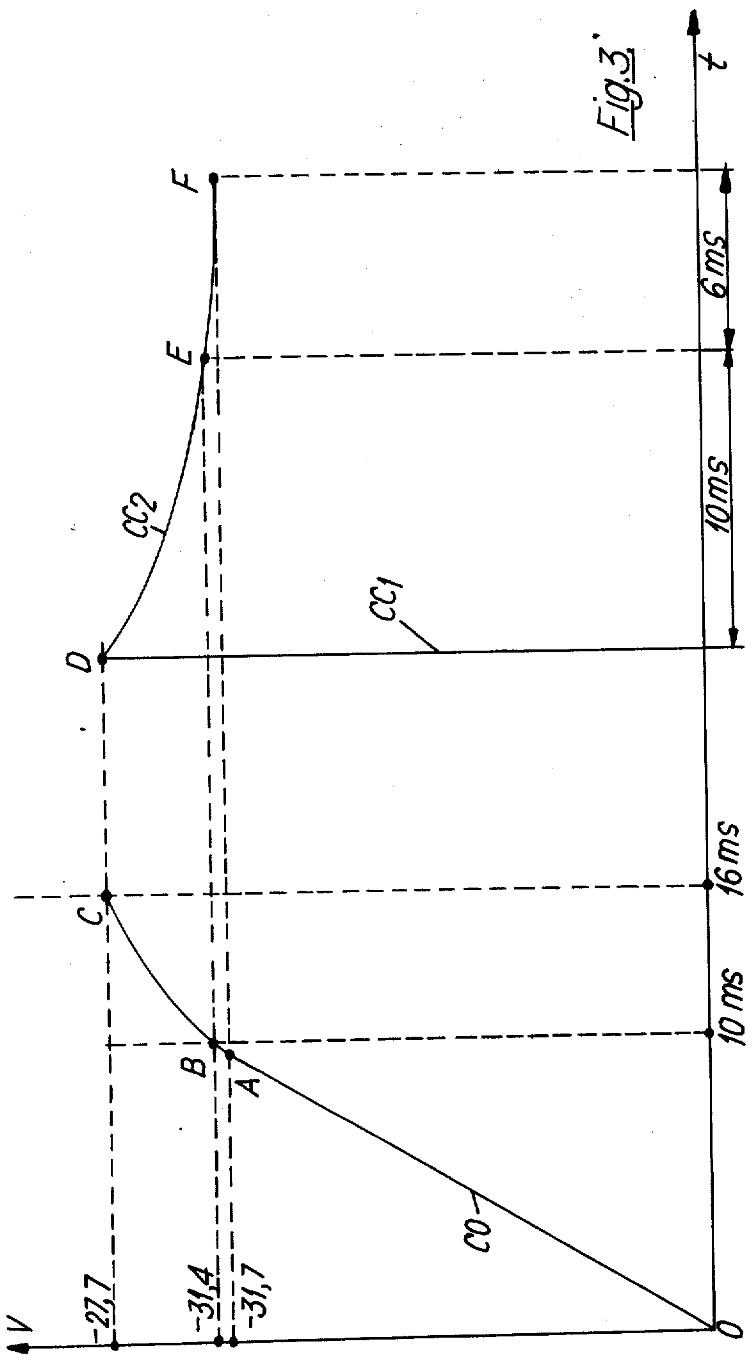
FIG. 3 shows charge and discharge curves of capacitors included in the receiver circuit RC of FIG. 2.

2. ground, R6, R7, battery;
3. ground, R14, R13, R15, C1, battery;

The capacitor C1 charges in this circuit from battery towards ground i.e. the voltage potential at the junction point of capacitor C1, resistor R15 and diodes d3 and *d*4 gradually increases from battery towards ground, as shown in FIG. 3 by the curve CO. These diodes d3 and *d*4 are initially blocked since their anodes are then at −48 Volts, whereas their cathodes are at about −27.7 Volts and −31.7 Volts respectively. It should be noted that at that moment the diodes d5 and d6 are both conductive. During the charge of capacitor C1 the voltage potential of the junction point of R13 and R14 increases from −14.3 Volts on.

4. ground, R8, R9, R10, d5, C2-R16, R7, battery;

The capacitor C2 charges in this circuit between the voltage potentials at the tapping points P1 and P4 since the diode *d*5 clamps the voltage potential of the upper junction point of C2 and R16 to that of P4 i.e. prevents this junction point from decreasing below −31.7 Volts.

5. ground, R20, R12, battery;

Due to this the emitter potential of the transistor T1 is at about −46.7 Volts.

6. ground; R14, R17 in parallel with R18, d6; C2-R16; R7; battery.

In this addition charge circuit capacitor C2 charges much slower than in circuit 4 due to the resistances included therein being much larger than those included in the latter circuit. The currents flowing in this circuit (6) are small since the resistance values of R17 and R18 are relatively high and since the potential value of the junction point of C2 and R16 is clamped to about −31.7 Volts. It should be noted that the voltage potential at the junction point of R13 and R14 increases from about −14.3 Volts to about −9.1 Volts since the charge of capacitor C1 changes from about −48 volts to −27.7 Volts, as will become clear later.

Transistor T1 is not conductive since its base and emitter are at battery potential and at −46.7 Volts respectively. Also transistor T2 is not conductive since its emitter is at a higher potential than its base due to the fact that a current flows through R18, and *d*6. The potential difference is equal to the voltage drop over the resistance R10, i.e. equal to about 0.3 Volts.

When the charge of the capacitor C1 reaches such a value that the diode d4 becomes conductive, i.e. increases above −31.7 Volts (point A in FIG. 3), the series connection of diode *d*3, resistors R9 and R10, and diode *d*5 is substantially short-circuited by this conductive diode d4 and the diode *d*5 is blocked. The capacitor C2 then mainly charges towards ground in the following circuit : ground, R14, R13, R15, d4, C2-R16, R7, battery. The capacitors C1 and C2 then charge further together towards ground with substantially the same time constant (part AC in FIG. 3). To simplify the explanation, these time constants are taken as equal in FIG. 3. It will be noted that C2 and C1 share resistors R14, R13, R15 as common charge resistors, i.e., common charge-discharge paths.

When the capacitors C1 and C2 are charged above −31.4 Volts (point B in FIG. 3) so that the base potential of transistor T2 becomes larger than its emitter potential transistor T2 becomes conductive and diode d6 is blocked. Consequently a negative going voltage step appears at the output Or of this transistor T2.

It should be noted that when the transistor T2 becomes conductive the voltage potentials at the tapping points P2 to P4 substantially remain the same due to the resistance R19 being relatively large.

The capacitors C1 and C2 continue charging until the voltage potential value at the junction point of C1, R15, d3 and d4 reaches that of the tapping point P2 i.e. −27.7 Volts (point C in FIG. 3). By the diode *d*3 which then becomes conductive the charge of the capacitors C1 and C2 is indeed clamped to this voltage potential i.e. it is prevented from increasing above this potential.

It should also be noted that the time constants of the charge circuits of the capacitors C1 and C2 have been so chosen that the transistor T2 is made conductive 10 milliseconds (point B in FIG. 3) after the capacitor C1 started charging (point O in FIG. 3) and that the charging of the capacitors C1 and C2 is stopped 16 milliseconds (point C in FIG. 3) after the capacitor C1 started charging.

From the above it follows that in the rest condition of the receiver circuit, i.e. 16 milliseconds after it has been put into service, the transistors T1 and T2 are not conductive and conductive respectively and the upper plates of both the capacitors C1 and C2 are charged to about −27.7 Volts.

The diodes *d*3 and *d*4 are conductive, whereas the diodes *d*5 and *d*6 are blocked.

When a subscriber in the subscriber station SS unhooks his telephone handset, the hook contacts hc of the subset are closed and hence the telephone line loop including conductors *a*,*b* is closed, enabling a path to be established from this subscriber station Ss to a receiver circuit RC via the main switching network MSN, an originating junctor circuit OJC and the signalling switching network SSN. More particularly, in the receiver circuit RC the make contacts *e*1 and *e*2 of a relay E*r* are subsequently closed by a peripheral circuit (not shown) controlled by the computer CO. These operations are not described in detail since they are without importance for the invention and since they are classical in the switching art.

When the make contacts *e*1 and *e*2 are closed, the base potential of the transistor T1 is increased to a value sufficient to render the latter transistor T1 conductive as long as the resistance value of the telephone line and the connection path between the subscriber station SS and the receiver circuit RC is smaller than 2 kilo-ohms.

Due to the transistor T1 being conductive capacitor C1 discharges very rapidly towards battery in the following circuit as shown by curve CC1 in FIG. 3:

7. battery, C1, d7, T1, R12, battery.

Indeed, the values of C1 and R12 are small. The diodes d3 and d4 are immediately blocked.

Consequently the capacitor C2 discharges (curve CC2 in FIG. 3) principally via resistor R16 and also slowly via resistor R17 due to the fact that the value of R17 is much larger than R16 and that it is connected to the junction point of the resistors R14 and R13, which is substantially immediately at about −32.1 Volts. Indeed the junction point of the resistors R13 and R15 is substantially immediately at about −48 Volts since the capacitor C1 is discharged very rapidly. When the capacitor C2 has discharged below −31.4 Volts (point E in FIG. 3) the transistor T2 is blocked and diode *d*6 becomes conductive. Consequently a positive going voltage step appears at the output Or of T2. A time interval later the charge of capacitor C2 reaches such a value (point F in FIG. 3) that diode D5 becomes conductive thus clamping the voltage potential of the junction point of C2 and R16 to −31.7 Volts. The time constants of the discharge circuits of the capacitors C1 and C2 have been so chosen that transistor T2 is blocked 10 milliseconds after the capacitors C1 and C2 started discharging and that capacitor C2 is discharged to −27.7 Volts 16 milliseconds after this start.

Summarizing, when the telephone line loop *a*, *hc*, *b* is closed :

- transistor T1 is immediately made conductive;
- the transistor T2 is blocked 10 milliseconds later hereby producing a positive going voltage step at the output Or;
- 16 milliseconds after this closure both the capacitors C1 and C2 are discharged to about −48 Volts and −31.7 Volts respectively. The diodes *d*3 and *d*4 are not conductive, whereas the diodes *d*5 and *d*6 are conductive.

When a subscriber in the subscriber station SS dials a telephone number the telephone line loop *a*, *hc*, *b* is opened for each dial pulse. During each such opening the receiver circuit RC tends to return to its above described rest condition. More particularly :

- the transistor T1 is immediately blocked;
- the transistor T2 is made conductive 10 milliseconds later hereby producing a negative going voltage step at the output Or;
- 16 milliseconds after this opening both the capacitors C1 and C2 are charged to about −27.7 Volts.

From the above it follows that each line opening of a predetermined minimum duration produces 10 milliseconds later at the output Or a negative going voltage pulse of the same duration, and that each line closure of a minimum duration produces 10 milliseconds later at the output Or a positive going voltage pulse of the same duration. In other terms, each pulse such as a dial pulse applied to the receiver circuit RC is delayed therein and appears 10 milliseconds later at the output Or thereof where it is detected upon this output being scanned by the scanner SC, the dial pulse being stored in the counter CR. These operations are performed under the control of the computer CO.

It should be noted that in order that a single pulse produced by an opening or closure of a telephone line loop should be delayed exactly by 10 milliseconds without being mutilated the loop opening should have a duration of at least 10 milliseconds and be preceded by a loop closure having a duration of at least 16 milliseconds, whereas the loop closure should have a duration of at least 10 milliseconds and be preceded by a loop opening having a duration of at least 16 milliseconds. Indeed :

- transistor T2 is made conductive exactly 10 milliseconds (point A in FIG. 3) after a loop opening on condition that capacitor C2 has been discharged during a preceding loop closure, the discharge time being equal to 16 milliseconds;
- transistor T2 is blocked exactly 10 milliseconds (point E in FIG. 3) after a loop closure on condition that capacitor C2 has been fully charged during a preceding loop opening, the charge time being equal to 16 milliseconds.

In other terms, successive pulses formed by telephone line loop openings and closures are delayed by exactly 10 milliseconds without being mutilated when they have durations at least equal to 16 milliseconds. This value may obviously be varied by modifying the time constants of the charge and discharge circuits of the capacitors C1 and C2. The value of 16 milliseconds has however been chosen because this minumum duration corresponds to a maximum dial speed. In order that a dial pulse with a minimum duration should be detected the scanning period of the output Or has been taken equal to 14 milliseconds. Telephone line loop openings and closures having durations smaller than 10 milliseconds and which are preceded by line openings of at least 16 milliseconds do not appear at the output Or of the receiver circuit RC. Indeed, if the telephone loop opening has a duration smaller than 10 milliseconds the charge on capacitor C2 which has been discharged to −31.7 Volts during a previous line closure never reaches a value sufficient to make transistor T2 conductive since it only starts charging 10 milliseconds after the opening, whereas if the line loop closure has a duration smaller than 10 milliseconds capacitor C2 which has been charged to −27.7 Volts during a previous line opening is never discharged to a value sufficient to make transistor T2 non conductive. Indeed, at the end of such a short line loop closure the capacitor C2 immediately starts charging in the above given circuit 5.

The above value of 10 milliseconds has been chosen because it corresponds to the very maximum duration of a spurious line loop opening or closure. It has been found empirically that telephone line loop openings and closures having durations comprised between 10 and 16 milliseconds never occur. Such openings and closures would appear at the output Or/of the receiver circuit RC with a delay smaller than 10 milliseconds as follows from the above, without further explanations.

The capacitor C3 has been provided for preventing short perturbations of the line to have an effect on the transistor T1.

It should be noted that the above dial pulses have substantially no effect on the potential value of the tapping point P1.

In the above signalling system the charge and discharge circuits of the capacitor C1 and the charge and discharge circuits of the capacitor C2 may be considered as first and second delay circuits which both form a filter which is adapted to eliminate two-level dial pulses below a predetermined duration equal to 10 milliseconds. These first and second delay means are able to effectively react to level changes caused by line openings and closures respectively and produce an output signal at the upper plate of the respective capacitor C1 and C2 only if the respective line opening and closure has the minimum duration. These output signals cause the triggering of the bistate device T2 to its conductive and non-conductive state respectively.

The output of first delay means, i.e. the upper plate of capacitor C1, is coupled to the second delay means to prepare these second delay means in order that when reacting to a loop closure they should be able to count the predetermined time interval of 10 milliseconds. Indeed, capacitor C2 is charged together with capacitor C1 to −27.7 Volts in order that capacitor C2 should be able to discharge in 10 milliseconds and then block the transistor T2.

When due to a fault the mains voltage of e.g. 220 Volts at 50 c/s is applied to one of the line conductors or between the line conductors *a* and *b* of the telephone line *a*, *b* shown this fault will be detected very rapidly as will be described hereinafter.

Indeed, in this case the mains voltage appears on the line conductor *b* even when the make contacts *e*1 and *e*2 are open since these line conductors are transformers coupled by the windings *w*1 and *w*2. This mains voltage is clipped at −48 Volts by the diode rectifier *d*1, and due to the junction point P1 of the resistors R6 and R7 being normally at about −38 Volts current can only flow through the diode rectifier *d*2 when the voltage at the junction point of the resistors R4 and R5 is higher than −38 Volts. This means that when the mains voltage source is connected between battery and the *b* line conductor the negative half waves thereof are completely clipped, whereas in case this mains voltage source is connected between ground and the *b* line conductor a large portion of the negative half waves is clipped. Hereinafter the latter case is considered by way of example.

Firstly it is supposed that the telephone line loop is in the closed condition, the transistors T1 and T2 being then conductive and not conductive respectively.

During the first clipped negative half wave of the applied alternating voltage and when the voltage potential at the junction point of the resistors R4 and R5 is larger than −38 Volts a current can flow from the line conductor *b* to junction point P1 via the resistors R3 and R4 and the diode rectifier *d*2 due to which the potential of this junction point P1 is increased. However the various resistance values have been so chosen that this potential rise is insufficient to block the diode *d*6 and to make transistor T2 conductive. When the voltage potential of the line conductor b has become lower than that of the emitter of transistor T1 which is at about −46.7 Volts the latter transistor T1 is blocked so that capacitor C1 starts charging. Since the maximum duration of the clipped negative half wave is equal to 10 milliseconds the transistor T1 is only blocked during a time interval smaller than 10 milliseconds. Hence it is already again conductive before capacitor C2 can start charging. Consequently capacitor C1 is discharged. Hereby it should be noted that the condition of transistor T2 remains unchanged.

During the following positive half wave of the applied mains voltage transistor T1 remains conductive. This transistor is a power transistor so that it can withstand a relatively large base current which may flow through it notwithstanding the existence of the resistors R3, R4, R5 and R12. Hereby also a current flows towards the junction point P1 the voltage potential of which is increased. When this increase is sufficiently high diode rectifier *d*6 is blocked due to which transistor T2 becomes conductive and the potential of the output terminal Or is decreased.

From the above it follows that only the positive half waves of the mains appear at the output terminal Or of the receiver circuit RC as pulses having each a duration somewhat smaller than 10 milliseconds.

Secondly it is supposed that the telephone line loop is open, the transistors T1 and T2 being then non conductive and conductive respectively.

During the first clipped negative half wave of the applied mains voltage transistor T1 remains blocked.

During the following positive half wave transistor T1 becomes conductive due to which capacitor C1 immediately discharges, whereas capacitor C2 discharges more slowly across resistor R16. Since this discharge time has a duration of 10 milliseconds which is the maximum duration of the positive half wave transistor T2 is not blocked. This positive half wave is also applied to the junction point P1 due to which T2 is also prevented from being blocked.

During the following negative half wave transistor T1 is again blocked so that capacitor C1 is charged, whereas capacitor C2 is prevented to do so since the maximum duration of this negative half wave is equal to 10 milliseconds.

During the following positive half wave the transistors T1 and T2 are in the same condition as for the above first considered positive half wave.

From the above it again follows that the positive half waves appear at the output terminal Or of the receiver circuit RC as pulses having each a duration some-what smaller than 10 milliseconds. These pulses are detected by the computer CO when the latter operates its scanner SC, the pulses being stored in the counter CR. Due to the scanning being performed every 14 milliseconds some of these pulses may be lost, but this is without importance since the computer only gives alarm when 15 of these pulses have been registered in the counter CR.

The above signalling system is hence not only able to eliminate certain input pulses having a duration smaller than 10 milliseconds, i.e. lying inside a predetermined frequency range, but is also able to detect input pulses (such as positive portions of AC power mains signals) having a duration smaller than 10 milliseconds, i.e. lying inside this frequency range. The detection circuit employs many of the elements coupling the input terminal Irb to the base of transistor T2.

While the principles of the invention have been described above in connection with specific apparatus, it is to be clearly understood that this description is make only by way of example and not as a limitation on the scope of the invention.

1. A two-level signalling system for providing output pulses at an output corresponding to DC pulses of a prescribed duration received on its input and for preventing DC pulses of shorter than a prescribed duration reaching the output comprising first and second input terminals coupled respectively between battery and ground potentials to receive input pulses, means coupled to said input terminals to eliminate input pulses having less than a predetermined duration and to transmit pulse having a predetermined duration, said means to eliminate input pulses including first means responsive to input pulse signals to energize first and second delay means, said delay means being able to effectively react to positive and negative level changes and to provide output signals to trigger a bistate device to a first or a second state respectively, indicating pulses have been received on the input terminals or not, said first and second delay means producing output signals only when the level changes occur during predetermined first and second time durations.

2. A two-level signalling system according to claim 1, in which the output of said first delay means is coupled to said second delay means to prepare said second delay means in order that when reacting to a negative level change they should be able to respond at the end of said second time duration.

3. A two-level signalling system according to claim 2, in which said first delay means includes a first capacitor charge and discharge circuit, said second delay means includes a second capacitor charge and discharge circuit, said first and second circuits having a common charge resistance and having first and second capacitors, the junction point of said first capacitor and said common resistance being coupled to the input of the system and via a first switch to said second capacitor and to said bistate device, said first switch being closed when the charge on said first capacitor exceeds a predetermined value and the junction point of said first switch and said second capacitor being also coupled to said bistate device.

4. A two level signalling system according to claim 3, in which said first switch is constituted by a first diode.

5. A two-level signalling system according to claim 4, in which said system further includes a first potentiometer circuit having first and second tapping points which are connected to said junction point of said first capacitor and said common charge resistance via a third diode and to the junction point of said second capacitor and said first diode via a fourth diode, respectively.

6. A two-level signalling system according to claim 5, in which said bistate device is constituted by an amplifier device with at least a first, a second and a third electrode, said first electrode being coupled on the said junction point of said second capacitor and said first diode via a fifth diode and to a voltage source via a fourth resistance, said second electrode being coupled to a third tapping point of said second potentiometer circuit intermediate between said first and second tapping points, and said third electrode being coupled to said voltage source via a fifth resistance.

7. A two-level signalling system according to claim 6, in which said amplifier device is constituted by a transistor, the base of which constitutes said first electrode.

8. A two-level signalling system according to claim 5, in which like first electrodes of said first and third diodes are interconnected, while like second electrodes of said first and fourth diodes are interconnected.

9. A two-level signalling system according to claim 4, in which the junction point of said second capacitor and said first diode is coupled to a tapping point of said common charge resistance via a third resistance.

10. A two-level signalling system according to claim 4, in which said system includes a second potentiometer circuit having a tapping point which is connected to a plate of said second capacitor different from the one connected to said first diode.

11. A two-level signalling system according to claim 3, in which said first capacitor charge and discharge circuit includes a first discharge path which is branched across said first capacitor and includes the series connection of a second switch and a first discharge resistance, said second switch being coupled to the input of the system and being controlled by said input pulses.

12. A two-level signalling system according to claim 11, in which said first discharge path also includes a second diode which shunts part of said common resistance.

13. A two-level signalling system according to claim 12, in which said second switch is constituted by a second transistor the base electrode of which is coupled to said input of the system and the other electrodes of which are branched between said second diode and said first discharge resistance.

14. A two-level signalling system according to claim 13, in which the junction point of one of said other electrodes and said first discharge resistance is connected to a voltage source via a sixth resistance.

15. A two-level signalling system according to claim 3, in which said second capacitor charge and discharge circuit includes a second discharge path which is branched across said second capacitor and is constituted by a second discharge resistance.

16. A two-level signalling system according to claim 1, in which the input of the system is coupled to said bistate device via detecting means adapted to detect signals having a frequency in a selected range such that said means including first and second delay means prevents them from triggering said bistate device.

17. A two-level signalling system according to claim 16, in which said detecting means include the series connection of a seventh resistance including a plurality of resistors and a sixth diode, which is connected via a potentiometer to a source of potential.

18. A two-level signalling system according to claim 17, in which said seventh resistance is connected to said base of said second transistor via an eighth resistance.

19. A two-level signalling system according to claim 18, in which said input of the system is also coupled to the one pole of a DC source feeding said means including first and second delay means and to the one speech conductors of a plurality of telecommunication lines, the other speech conductors of which are coupled to the other pole of said DC source.

20. A two-level signalling system according to claim 19, in which said one and other speech conductors are connected to said one and other poles of said DC source via first and second windings of a transformer.

21. A two-level signalling system according to claim 17, in which said input of the system is connected to one end of said potentiometer via a clamping seventh diode which also forms part of said detecting means.

22. A signalling system for providing first output pulses at an utput corresponding to DC pulses of a prescribed duration received on its input and for preventing DC pulses of shorter than a prescibed duration reaching the output and for providing second output pulses when AC signals exceeding a particular voltage level are coupled to the input, including a receiver to receive input signals applied to the system input, in which said receiver includes a filter preventing input signals of lower than a selected voltage and having a duration less than a selected period from appearing at its output and means coupled to said system input responsive to input signals of higher than said selected voltage and having a duration less than said selected period to provide said second output pulses.

23. A signalling system according to claim 22, in which said means enable said input signals of higher voltage and having a duration less than said selected period to appear at said system output which is coupled to a counter for these input signals.

* * * * *